United States Patent
Kawai et al.

(10) Patent No.: US 9,007,743 B2
(45) Date of Patent: Apr. 14, 2015

(54) SOLID ELECTROLYTIC CAPACITOR (75) Inventors: Akihiro Kawai, Miyagi (JP); Kenji Araki, Miyagi (JP)

(73) Assignee: Nec Tokin Corporation, Miyagi (JP)

( * ) Notice: Subject to any disclaimer, the term of this patent is extended or adjusted under 35 U.S.C. 154(b) by 79 days.

(21) Appl. No.: 13/446,265

(22) Filed: Apr. 13, 2012

(65) Prior Publication Data

US 2012/0262847 A1    Oct. 18, 2012

(30) Foreign Application Priority Data

Apr. 15, 2011  (JP) ................ 2011-090662
Feb. 15, 2012  (JP) ................ 2012-030286

(51) Int. Cl.
*H01G 9/00* (2006.01)
*H01G 4/228* (2006.01)
*H01G 9/10* (2006.01)
*H01G 9/15* (2006.01)
*H01G 9/012* (2006.01)
*H01G 9/04* (2006.01)
*H01G 9/26* (2006.01)
*H01G 9/042* (2006.01)

(52) U.S. Cl.
CPC ............ *H01G 9/15* (2013.01); *H01G 9/042* (2013.01); *H01G 9/012* (2013.01); *H01G 9/04* (2013.01); *H01G 9/26* (2013.01)

(58) Field of Classification Search
CPC ......... H01G 9/15; H01G 9/012; H01G 9/042; H01G 9/04; H01G 9/26
USPC .......................... 361/538, 523, 540
See application file for complete search history.

(56) References Cited

U.S. PATENT DOCUMENTS

2006/0262486 A1*  11/2006  Tadanobu et al. ............ 361/523
2008/0089014 A1*   4/2008  Ishizuka et al. .............. 361/528

FOREIGN PATENT DOCUMENTS

| JP | 2002-367862 A |   | 12/2002 |
|----|---------------|---|---------|
| JP | 2004-103981   |   |  4/2004 |
| JP | 2006-190925 A |   |  7/2006 |
| JP | 2008-258602 A |   | 10/2008 |
| JP | 2008-270317 A |   | 11/2008 |
| JP | 2010-062498 A |   |  3/2010 |
| JP | 2010-123728 A |   |  3/2010 |
| JP | 2010062498 A  | * |  3/2010 |

* cited by examiner

*Primary Examiner* — Eric Thomas
*Assistant Examiner* — Arun Ramaswamy
(74) *Attorney, Agent, or Firm* — Maier & Maier, PLLC (57) ABSTRACT Provided is a solid electrolytic capacitor that is excellent in productivity, has improved volumetric efficiency aiming for capacity increase, a stable fillet shape when mounted, and has excellent ESL characteristics. Included is a capacitor stack element composed of a stack of capacitor elements. The capacitor element includes one anode part of an anode body made of linear, foil-like, or plate-like valve metal and a cathode part composed of dielectric, solid electrolyte, graphite, and silver paste layers, which are sequentially formed to another surface of the anode body separated by insulating resin. A fillet formation part with a recessed part is provided to an end surface of anode and cathode terminals of a mounting electrode side of a first direction end surface of the electrode substrate to which the capacitor stack element is mounted. Further, the anode and cathode terminals for element connection reach the end surface of the first direction.

11 Claims, 9 Drawing Sheets

SOLID ELECTROLYTIC CAPACITOR

RELATED APPLICATIONS

This application claims priority under 35 U.S.C. §119 to Japanese Patent Application No(s): 2011-090662 filed on Apr. 15, 2011 and 2012-030286 filed Feb. 15, 2012, the disclosures of which are incorporated by reference herein their entireties.

BACKGROUND OF THE INVENTION

1. Field of the Invention

The present invention relates to a solid electrolytic capacitor used for a power supply circuit etc.

2. Description of Related Art

There has been a solid electrolytic capacitor using tantalum, niobium, or the like as a valve metal. Such a solid electrolytic capacitor is small, has a large capacitance, excellent frequency characteristics, and low ESL (equivalent series inductance) characteristics and is widely used for a decoupling circuit, a power supply circuit or the like of a CPU (Central Processing Unit).

Commercial production of the solid electrolytic capacitor of especially a substrate electrode structure type is progressing with development of a portable electronic device. When this kind of solid electrolytic capacitor is mounted on an electronic circuit board, the structure of a connection part between a terminal part and a mounting board which is called a solder fillet becomes important along with the terminal part of the mounting electrode surface.

Japanese Unexamined Patent Application Publication No. 2004-103981 discloses a technique of forming recesses on a side surface part of an anode terminal and a cathode terminal in a solid electrolytic capacitor. These recesses are created to the mounting surface side or the mounting surface side and the opposite side as well. When the solid electrolytic capacitor is mounted to a mounting substrate using solder, from the mounting surface side to a bottom surface of the recesses, the solder bonds the bottom surface and the mounting substrate.

Japanese Unexamined Patent Application Publication No. 2008-258602 discloses a technique of forming a concave shape fillet formation surface (codes 15e and 15f in FIG. 8 of Japanese Unexamined Patent Application Publication No. 2008-258602) that vertically penetrates in the side surface of a conversion substrate of the lower surface electrode solid electrolytic capacitor. In detail, a cutout section is provided on a surface exposed to an outside surface. The conversion substrate, which has an anode terminal formation part and a cathode terminal formation part of which inside is plated, is used for connection to a capacitor element. After outer coating resin (the code 19 of FIG. 8 of Japanese Unexamined Patent Application Publication No. 2008-258602) is formed, cutting is performed along cutting surfaces, thus a fillet formation surface is formed on the outside surfaces of the anode and cathode of the lower surface electrode type solid electrolytic capacitor.

Japanese Unexamined Patent Application Publication No. 2008-270317 discloses a technique of providing the fillet formation part in a side surface concave part of an insulating plate. Further, Japanese Unexamined Patent Application Publication No. 2006-190925 discloses a technique of giving rise to low ESL characteristics by reducing a lead-out distance to a mounting surface of an anode leadframe and a cathode leadframe.

As a smaller size is required for the solid electrolytic capacitor, it is necessary to improve volumetric efficiency of a capacitor element for an outline of the solid electrolytic capacitor in order to further reduce the size. However, there are problems in the structure with the recesses in the leadframes (as in Japanese Unexamined Patent Application Publication No. 2004-103981) and the structure with the fillet formation part in the electrode substrate (as in Japanese Unexamined Patent Application Publication Nos. 2008-258602 and 2008-270317), thus the inventors have found a problem that it is difficult to provide stable fillet formation while improving the problems.

In the case of the structure of Japanese Unexamined Patent Application Publication No. 2004-103981, as a partly L-shaped manufacturing frame (leadframe) is embedded in the outer coating resin, the volumetric efficiency is reduced. Further, the outer coating resin will leak to the leadframe mounting terminal surface, and a failure is generated at the time of mounting to the circuit substrate.

Japanese Unexamined Patent Application Publication No. 2004-103981 discloses the structure in which the surface (concave part) exposed to the outside surface of the anode and the cathode of the capacitor is plated and the fillet is formed in the plated part. However, a part including the fillet is limited to the thickness of the leadframe, and the height for forming the fillet may be insufficient.

In the case of the structure of Japanese Unexamined Patent Application Publication No. 2008-258602, the solder gets wet in the fillet formation surface. However, the electrode substrate projects outside the outer coating resin, and the size of the outer coating resin is limited. Therefore, the cathode area is reduced and thereby generating a disadvantageous structure for capacity increase.

Moreover, the second anode upper terminal (code 25) shown in FIG. 1 of Japanese Unexamined Patent Application Publication No. 2008-270317 has the structure that does not extends to the product end surface.

This is because that the gas generated (steam or solvent volatile content from resin) from inside the capacitor terminal due to the thermal history through reflow at the time of product mounting cannot sufficiently escape from inside the capacitor element as the insulating plate and the outer coating resin are adhered. Accordingly, gas pressure may cause warpage of the insulating plate and delamination between the insulating plate and the outer coating resin.

Japanese Unexamined Patent Application Publication No. 2006-190925 discloses a technique of using a leadframe structure aiming for low ESL. In the case of the leadframe structure, processing is difficult and it takes more time to change a mounting terminal and an inner terminal involved with the change in product size as compared with the substrate structure, thus there is a difficulty in mass productivity. Additionally, in the leadframe structure, the outer coating resin may wrap around the electrode terminal of the mounting surface side at the time of forming the external part, and there has been a solder wettability problem of the external terminal when the capacitor is mounted to a substrate.

Therefore, a purpose of the present invention is to provide a solid electrolytic capacitor that solves the abovementioned problem, is excellent in productivity, improves the volumetric efficiency aiming to increase the capacity, and has a stable fillet shape at the time of mounting.

SUMMARY OF THE INVENTION

In order to solve the abovementioned problem, the present invention provides a solid electrolytic capacitor that enables stable fillet formation at the time of mounting as there is a non-penetrating electrode substrate recessed part in an end part of the electrode substrate and a side surface and an upper part of the electrode substrate recessed part are plated and solder is adhered not only to the side surface but to the upper part, prevents delamination between the electrode substrate and outer coating resin as the electrode for element connection reaches both end surfaces in a first direction (900) and gas generated from inside a capacitor element easily escapes, and also has low ESL characteristics as a current path between an anode terminal and a cathode terminal is reduced.

According to an aspect of the present invention, a solid electrolytic capacitor includes a capacitor element including an anode part that is placed to at least one end part of an anode body including linear, foil-like, or plate-like valve metal and a cathode part that is placed in a region separated from the anode part by insulating resin, an electrode substrate including an electrode terminal for element connection that is formed to one surface and electrically connected to the anode part or the cathode part of the capacitor element, an electrode terminal of a mounting electrode side that is formed to another surface and electrically connected to an electrode terminal of a circuit substrate, and a connection part that electrically connects the electrode terminal for element connection and the electrode terminal of the mounting electrode side, and a covering member that covers the capacitor element. A first recessed part is formed to a side surface that is placed in a first direction of the electrode substrate, and the first recessed part is covered with a conductive member so that the first recessed part is electrically connected to the electrode terminal of the mounting electrode side or the electrode terminal for element connection. Further, the electrode terminal for element connection extends to an end surface of the covering member at least along with the first direction and covers an upper part of the first recessed part.

According to the present invention, the electrode terminal of the mounting electrode side includes a first electrode terminal that extends to one end surface placed in the first direction of the covering member, a second electrode terminal that extends to another end surface placed in the first direction of the covering member, and a third electrode terminal that is electrically connected to an electrode terminal and placed in a region spaced from the second electrode terminal. The electrode terminal has a polarity different from the electrode terminal for element connection that is electrically connected to the first electrode terminal or the second electrode terminal. A second recessed part is formed to a side surface placed in a second direction that is perpendicular to the first direction of the electrode substrate and the second recessed part is covered with the conductive member so that the second recessed part is electrically connected to the third electrode terminal or the electrode terminal for element connection connected to the third electrode terminal, and the third electrode terminal extends to the end surface of the covering member along the second direction and covers an upper part of the second recessed part. Further, the capacitor element may be made by sequentially forming a dielectric layer, a solid electrolyte layer, and a cathode layer on the surface of a porous body made of a sintered body of valve metal with an anode lead derived from one end. Alternatively, the capacitor element may have a transmission line structure including an anode lead derived from both ends and a cathode part in which a dielectric layer, an electrolyte, and a cathode layer are sequentially formed on the surface of a porous body of valve metal in the middle part.

When the sold electrolytic capacitor obtained as above is solder-mounted to a land formed to a solid substrate, solder is coated to at least a part of the recessed part, which is the fillet formation part of the solder. The first recessed part includes an opening in the first direction, and the length of the second direction that is perpendicular to the first direction in the opening is preferably 10% or longer than the length of the second direction of the electrode terminal of the mounting electrode side near the first recessed part. The second recessed part includes an opening in the second direction, and the length of the first direction that is perpendicular to the second direction in the opening is 10% or longer than the length of the first direction of the electrode terminal of the mounting electrode side near the second recessed part.

According to the present invention, by providing the recessed part at a predetermined position of the electrode substrate, it is possible to stably provide a fillet that is formed at the time of soldering the anode terminal and the cathode terminal of the mounting electrode side to the circuit board.

According to the present invention, as the electrode terminal for element connection reaches an end surface of the solid electrolytic capacitor, gas generated from inside of the capacitor terminal or the like easily escapes (in the case of the outer coating resin and the terminal, it is resin and metal, thus there may be a gap generated more likely than the case of the outer coating resin and the electrode substrate (resin)).

As the leadframe is not used in this structure, the present invention is highly productive and improves the volumetric efficiency as well.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, embodiments of the present invention are described using the drawings. Duplicate explanation is omitted in the following explanation.

First Exemplary Embodiment

A first embodiment is explained using FIGS. 1A to 1D and FIGS. 5A and 5B.

Figure 1A:
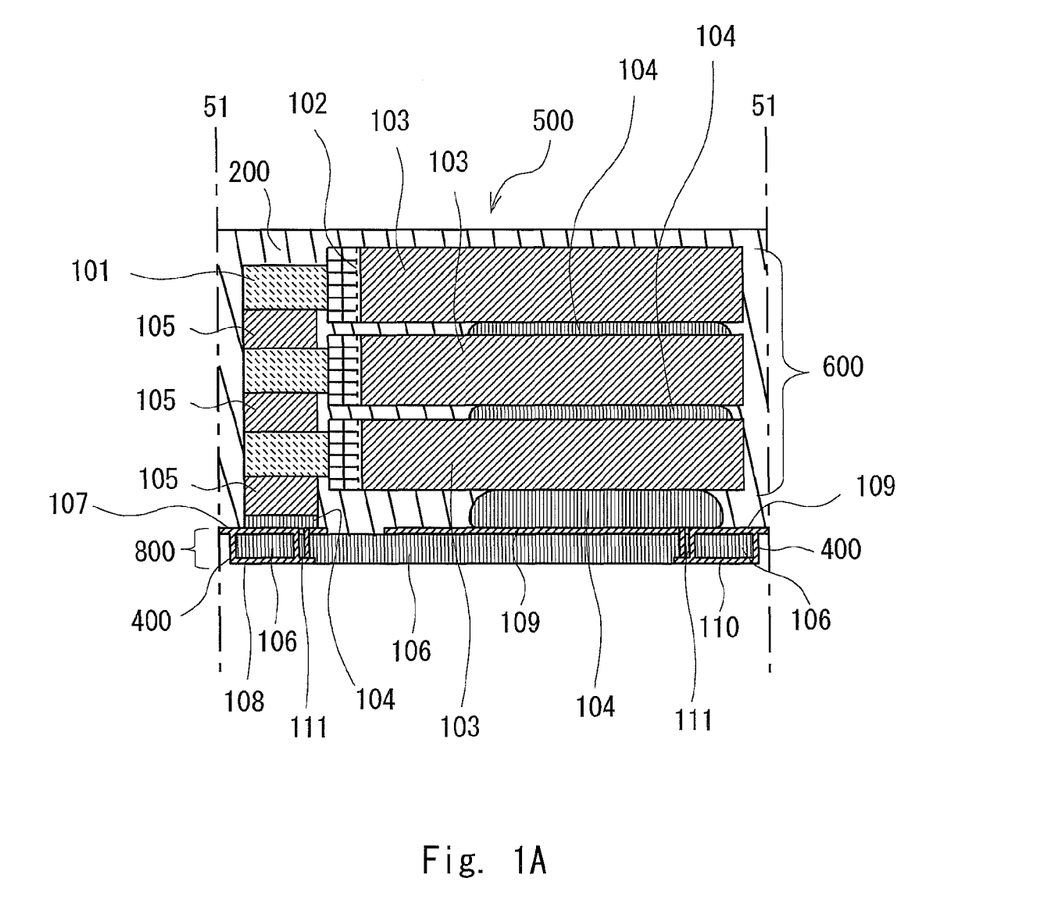
FIG. 1A is a product cross-sectional diagram of a solid electrolytic capacitor according to a first embodiment of the present invention.
Figure 1B:
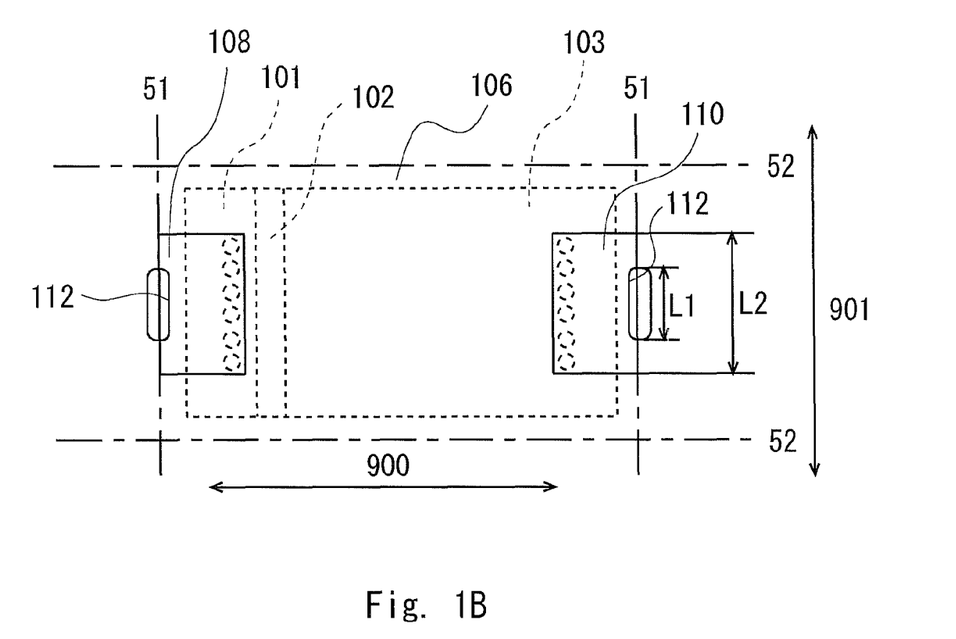
FIG. 1B is a product bottom view of the solid electrolytic capacitor viewed from a mounting electrode side according to the first embodiment of the present invention.
Figure 1C:
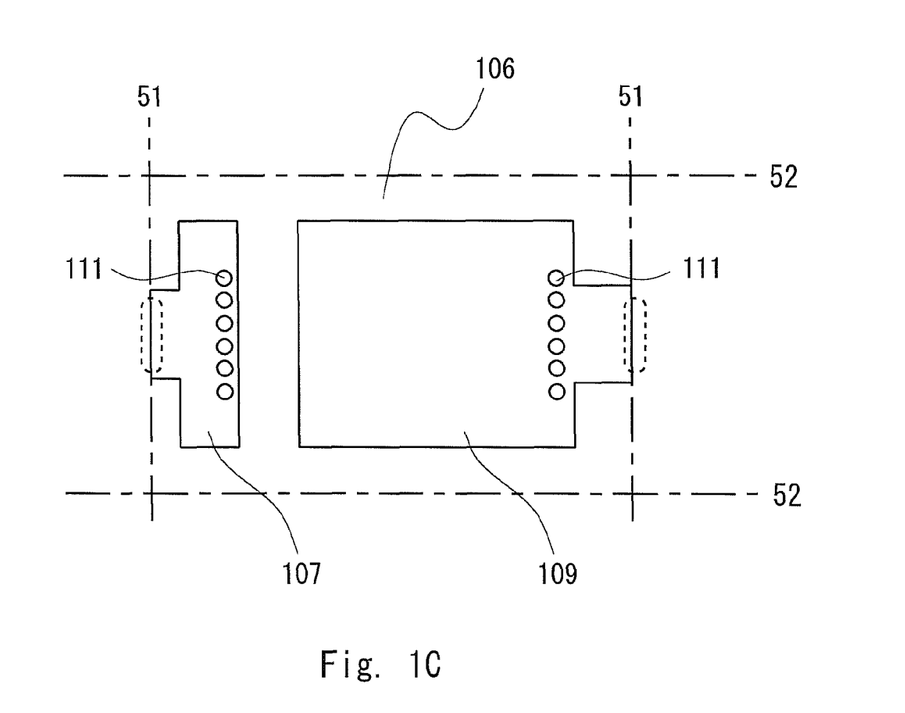
FIG. 1C is a top view of an electrode substrate viewed from an electrode for element connection side in the solid electrolytic capacitor according to the first embodiment of the present invention.
Figure 1D:
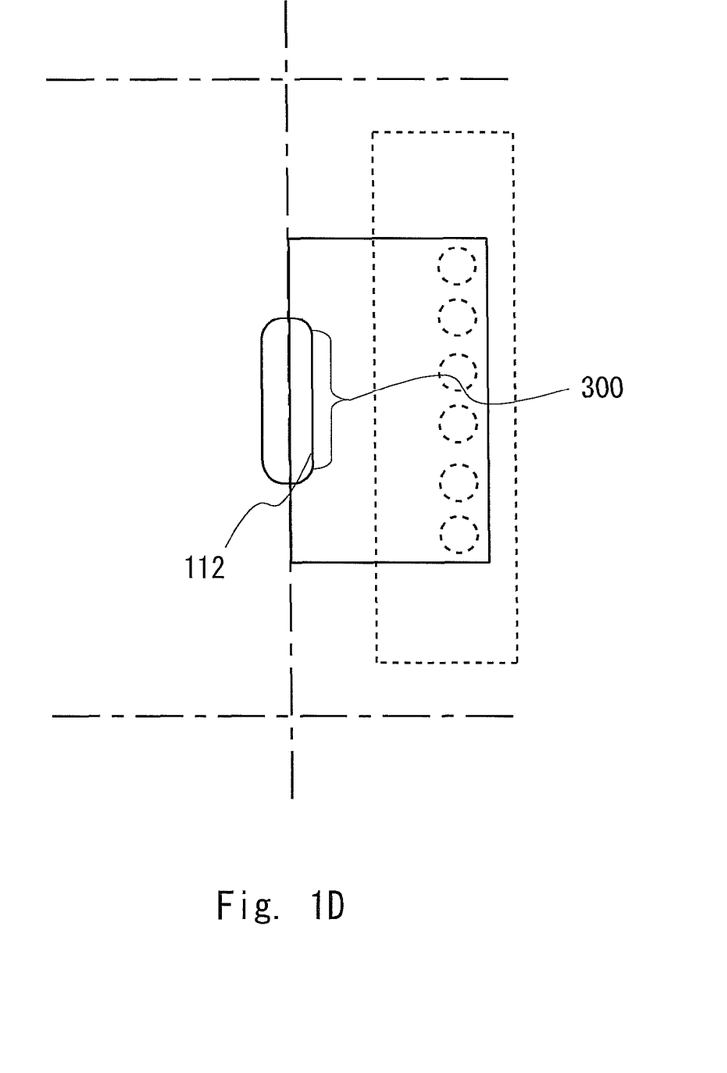
FIG. 1D is an enlarged diagram near a recessed part in the solid electrolytic capacitor according to the first embodiment of the present invention.

FIGS. 1A to 1D are views showing a solid electrolytic capacitor according to the first embodiment of the present invention. FIG. 1A is a cross-sectional diagram of one solid electrolytic capacitor. FIG. 1B is a product bottom view viewed from a mounting electrode side. FIG. 1C is a top view viewed from an electrode terminal for element connection side. FIG. 1D is an enlarged diagram of a code 112 part of FIG. 1B.

A solid electrolytic capacitor 500 can be obtained by the manufacture as described below. First, a capacitor element is manufactured. The capacitor element includes one capacitor element anode part (anode part) 101 of an anode body including a linear, foil-like, or plate-like valve metal and a capacitor element cathode part (cathode part) 103 including a dielectric layer, a solid electrolyte layer, a graphite layer, and a silver paste layer, which are sequentially formed to the other surface of the anode body separated by insulating resin 102.

Next, a metal piece 105 is welded to the capacitor element anode part 101. After that, a capacitor stack element 600 is manufactured by stacking capacitor elements so that the capacitor element cathode part 103 is connected to the capacitor element cathode part 103 of another layer via conductive adhesive 104, and the capacitor element anode part 101 is connected to the capacitor element anode part 101 of another layer via the metal piece 105.

Next, the bottom metal piece 105 of the anode part of the capacitor stack element 600 and an anode terminal for element connection 107 of an electrode substrate 800, and the bottom capacitor element 103 of the capacitor stack element 600 and a cathode terminal for element connection 109 of the electrode substrate 800 are connected via the conductive adhesive 104. Note that the configuration of the electrode substrate 800 is described later.

Then, after covering and sealing the capacitor stack element 600 with the outer coating resin 200 made of epoxy resin, for example, the capacitor stack element 600 is cut into a product outline shape by a dicing process or laser beam process, and the solid electrolytic capacitor 500 is manufactured.

The position to cut is indicated by cutout lines 51 and 52 shown in FIGS. 1B and 1C. The cutout line 51 extends in a second direction 901. The product external dimension of the depth direction of the solid electrolytic capacitor 500 is specified by cutting along the cutout line 51. The cutout line 51 of this embodiment is set to pass through a substantially middle position in the short side direction of long holes formed in a substrate 106 of the electrode substrate 800 that is described later for details.

The cutout line 52 extends in a first direction 900 that is perpendicular to the second direction 901. The product external dimension of the width direction of the solid electrolytic capacitor 500 is specified by cutting along the cutout line 52. The cutout line 52 of this embodiment is set so that a recessed part 112 formed in the electrode substrate 800 is placed at the substantially middle position with the adjacent cutout line 52, as described later. In addition, the mounting electrode side anode terminal 108 and the mounting electrode side cathode terminal 110 are placed at the substantially middle position with the adjacent cutout line 52. Further, the cutout line 52 of this embodiment is placed so that the anode terminal for element connection 107 and the cathode terminal for element connection 109 are placed at the substantially middle position with the adjacent cutout line 52.

Next, a configuration of the electrode substrate 800 is explained in detail. As shown in FIGS. 1B and 1C, the long holes with the second direction 901 as the longitudinal direction are previously formed in spaced-apart fashion in the first direction 900 to the substrate 106 of the element substrate 800. When the substrate 106 is cut at the abovementioned cut position and singulated, the long holes are cut at the substantially middle position of the short side direction, and the recessed part 112 is formed to both side surfaces placed in the first direction 900 in the singulated substrate 106. At this time, although the recessed part 112 has an opening in the first direction 900, a length L1 in the second direction 901 of the opening is preferably 10% or longer than a length L2 in the second direction 901 of the electrode terminal of the mounting electrode side near the recessed part 112. When the opening is less than 10%, the solder may be concentrated in the fillet. Incidentally, the length L1 in the second direction 901 of the opening is preferably 50% or longer than the length L2 in the second direction 901 of the electrode terminal of the mounting electrode side near the recessed part 112. Further, as shown in FIG. 1D, a part (a part parallel to the cutout line 51 in this embodiment) 300 parallel to an end surface of the solid electrolytic capacitor 500 in the recessed part 112 is preferably a straight planar surface. This is because that the visibility of the fillet formation part by the solder after mounting will become favorable.

Then, a conductive member is formed, so that for the singulated substrate 106, the entire side surface circumference including the recessed part 112 is covered, the anode terminal for element connection 107 and the cathode terminal for element connection 109 are formed in a predetermined region of the upper surface of the substrate 106, and the mounting electrode side anode terminal 108 and the mounting electrode side cathode terminal 110 are formed in a predetermined region of a lower surface of the substrate 106. As the conductive member, plating is applied, for example.

At this time, the anode terminal for element connection 107 and the cathode terminal for element connection 109 extend to the end surface of the solid electrolytic capacitor 500 (the end surface here is the cutout line 51 that is the end surface of the outer coating resin 200) and are formed to cover the upper part of the recessed part 112. Moreover, the anode terminal for element connection 107 and the mounting electrode side anode terminal 108 are electrically connected to the conductive member of another recessed part 112, and the cathode terminal for element connection 109 and the mounting electrode side cathode terminal 110 are electrically connected to the conductive member of the other recessed part 112. Such non-penetrating recessed part 112 shall be a fillet formation part 400. As the upper part of the recessed part 112 is non-penetrating, meaning that the upper part is covered with the element terminal for element connection, when the capacitor stack element 600 is covered with the outer coating resin 200, the outer coating resin 200 will not leak to the recessed part 112. Note that the same exemplary advantage can be achieved when the shape of the recessed part 112 is half-long hole shape and polygonal hole shape. Further, the conductive member of the recessed part 112 may be electrically connected to at least one of the electrode terminal for element connection or the element terminal of the mounting electrode side.

Furthermore, the anode terminal for element connection 107 and the mounting electrode side anode terminal 108, and the cathode terminal for element connection 109 and the mounting electrode side cathode terminal 110 are electrically connected through vias. Note that the configuration of the via is described later.

Next, the structure of the fillet formation part 400 and the via 111 is described.

Figure 5A:
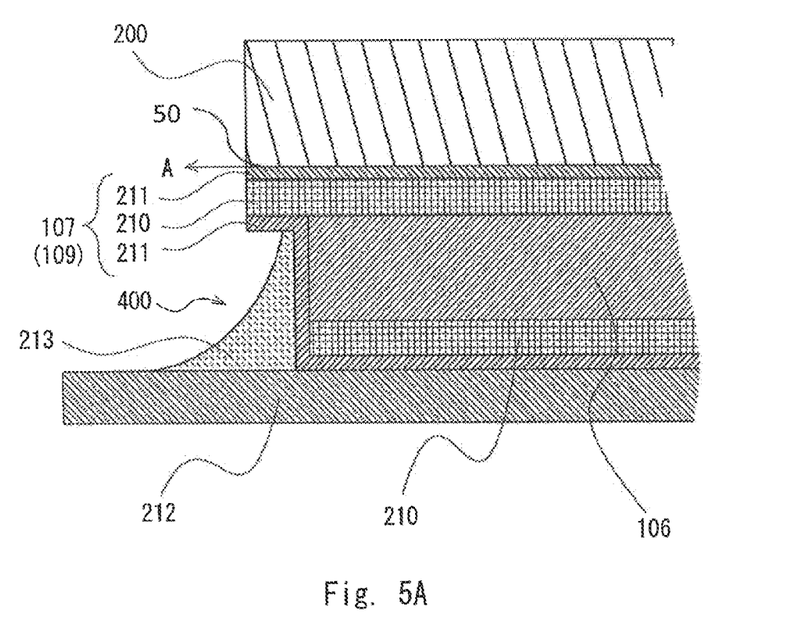
FIG. 5A is a detail view of a fillet formation part in the electrode substrate of the solid electrolytic capacitor according to the embodiment of the present invention, and shows a solder coated state after solder mounting.
Figure 5B:
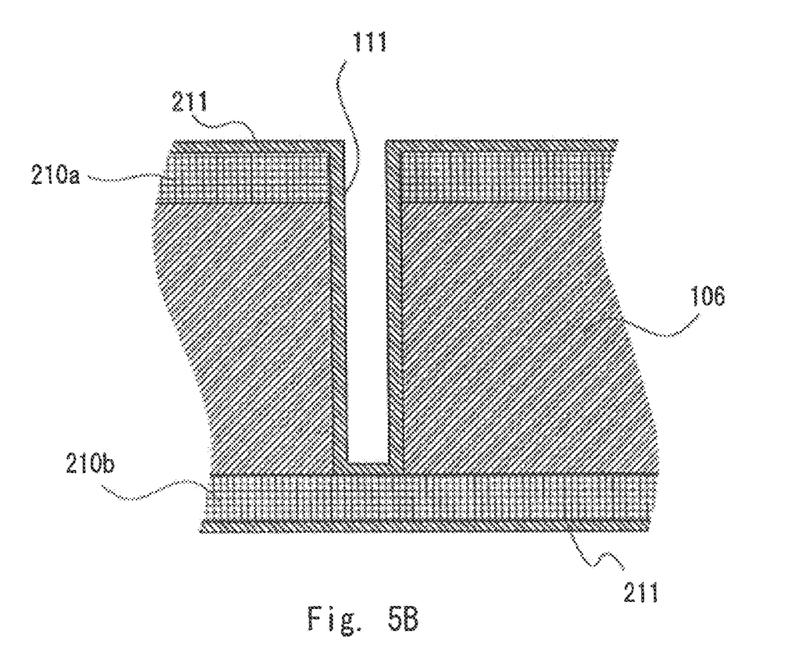
FIG. 5B is a detail view of a via part in the electrode substrate of the solid electrolytic capacitor according to the embodiment of the present invention.

FIGS. 5A and 5B are views for explaining a part of the electrode substrate 800 in detail. FIG. 5A is a detail view of the fillet formation part 400 and the solder coated state after solder mounting. FIG. 5B is a detail view of the via part.

As shown in FIG. 5A, the fillet formation part 400 is a non-penetrating structure. Specifically, the upper part of the fillet formation part 400 is covered with the anode terminal for element connection 107 and the cathode terminal for element connection 109. In other words, the anode terminal for element connection 107 and the cathode terminal for element connection 109 reach the end surface of the first direction 900 of the solid electrolytic capacitor 500. In short, the substrate 106 is not placed to the upper part of the recessed part 112, and the anode terminal for element connection 107 and the cathode terminal for element connection 109 are exposed from the end surface of the solid electrolytic capacitor 500. Plating is applied as the anode terminal for element connection 107 and the cathode terminal for element connection 109. When the capacitor stack element 600 is covered with the outer coating resin 200, there is a slight gas escape gap 501 generated with the outer coating resin 200. Therefore, the gas generated within the conductive adhesive 104 and the capacitor element at the time of mounting can escape via gas escape gap 501 outside along the arrow A direction.

Additionally, as the side surface and the upper part of the fillet formation part 400 are covered with plating and not only the side surface but the upper part of the fillet part of the solder 213 are wet at the time of mounting, a stable solder fillet is formed.

At this time, when it is the outer coating resin 200 and the substrate 106 instead of the electrode terminal for element connection, which is metal, as the outer coating resin 200 and the substrate 106 are both resin and highly adhesive, gas hardly escapes, thus the gas expands and causes delamination between the outer coating resin 200 and the electrode substrate.

A detailed structure of the via 111 is shown in FIG. 5B. As shown in FIG. 5B, the via 111 is made by opening a hole down to copper foil 210b using laser, and a plating layer 211 by copper plating and gold plating is formed to the surface of the copper foil 210a and 210b and the surface inside the via 111.

As shown in FIG. 5A, such solid electrolytic capacitor 500 is preferably adhered to the circuit substrate (mounting substrate) 212 in the recessed part 112 via the solder 213. At this time, the recessed part 112 and a part of the electrode terminal for element connection is covered with the fillet formed of the solder 213.

Second Exemplary Embodiment

Figure 2A:
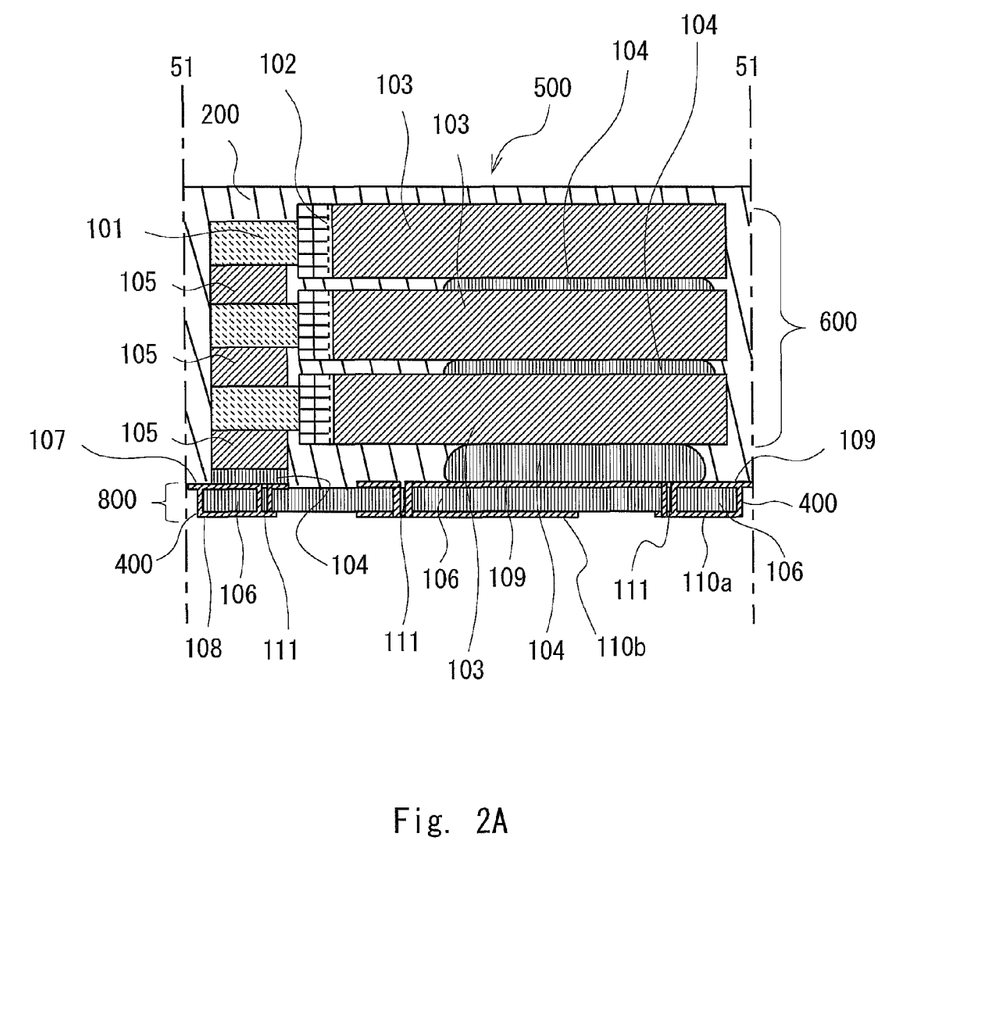
FIG. 2A is a product cross-sectional diagram of a solid electrolytic capacitor according to a second embodiment of the present invention.
Figure 2B:
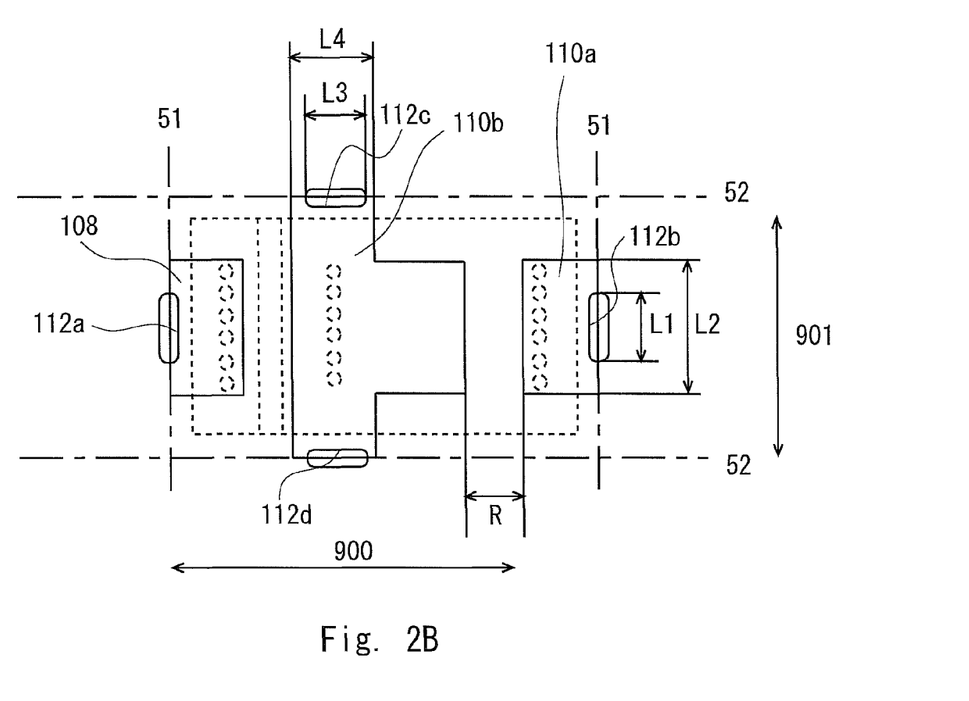
FIG. 2B is a product bottom view of the solid electrolytic capacitor viewed from the mounting electrode side according to the second embodiment of the present invention.
Figure 2C:
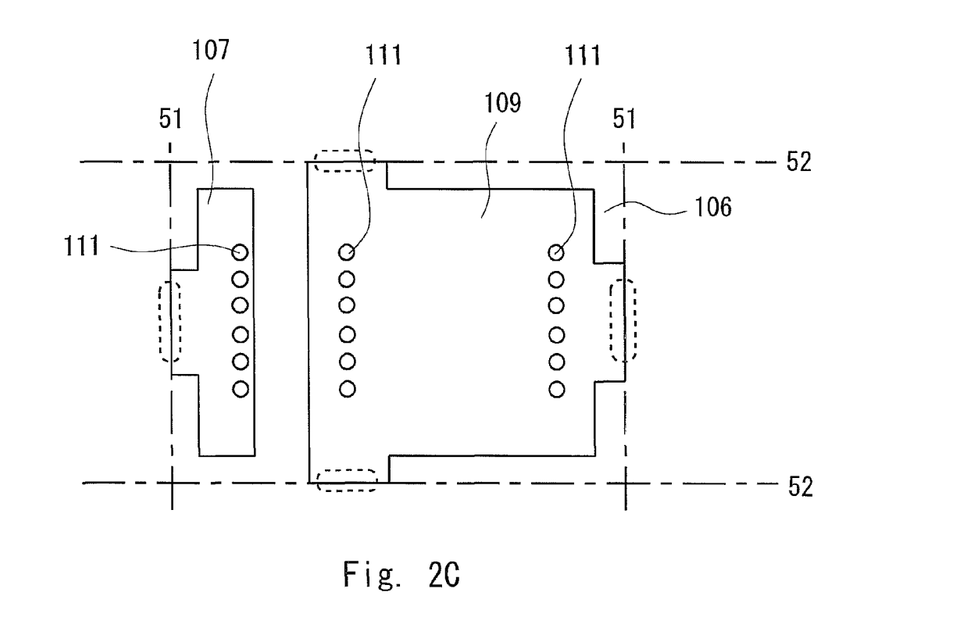
FIG. 2C is a top view of the electrode substrate viewed from the electrode for element connection side in the solid electrolytic capacitor according to the second embodiment of the present invention.

A second embodiment is explained using FIGS. 2A to 2C.

FIGS. 2A to 2C show the configuration of a solid electrolytic capacitor according to the second embodiment of the present invention. FIG. 2A is a cross-sectional diagram of one solid electrolytic capacitor. FIG. 2B is a product bottom view viewed from the mounting electrode side. FIG. 2C is a top view viewed from the electrode for element connection.

As the manufacture of the capacitor stack element 600 is same as the first embodiment, the explanation is omitted here. As shown in FIG. 2A, there are three terminals of the mounting electrode in the electrode substrate 800 of this embodiment.

That is, a second cathode terminal 110b of the mounting electrode side is placed at a position spaced with an interval R in the first direction 900 from a first cathode terminal 110a of the mounting electrode side (which is mounting electrode side cathode terminal 110 of the first embodiment). This second cathode terminal 110b extends in the second direction 901 as shown in FIG. 2B.

In a similar manner as the first embodiment, the bottom metal piece 105 of the capacitor stack element 600 and the anode terminal for element connection 107, and the bottom capacitor element cathode part 103 of the capacitor stack element 600 and the cathode terminal for element connection 109, are connected via the conductive adhesive 104 using such electrode substrate 800.

After that, in a similar manner as the first embodiment, the solid electrolytic capacitor 500 is manufactured by covering with the outer coating resin 200 and then cutting along the cutout lines 51 and 52 by the dicing process or laser beam process. The cutout lines 51 and 52 are set to pass through the substantially middle position of long holes that are formed in the substrate 106 for forming recessed parts (112a to 112d) in the four side surfaces. Incidentally, as the recessed parts 112a and 112b have openings in the first direction 900 at the time of cut, the length L1 in the second direction 901 of the opening is preferably 10% or longer than the length L2 in the second direction 901 of the electrode terminal of the mounting electrode side near the recessed part 112a or 112b. Moreover, the recessed parts 112c and 112d have openings in the second direction 901. A length L3 in the first direction 900 of the opening is preferably 10% or longer than a length L4 in the first direction 900 of the electrode terminal of the mounting electrode side near the recessed part 112c or 112d.

In such solid electrolytic capacitor 500, as the second cathode terminal 110b is closer to the mounting electrode side anode terminal 108 as compared to the solid electrolytic capacitor 500 of the first embodiment, ESL can be reduced. To be more specific, the shorter the distance between the mounting electrode side anode terminal 108 and the second cathode terminal 110b, the shorter the current path, thereby increasing the reduction effect of ESL.

It is preferable that the second cathode terminal 110b of the mounting electrode side reaches an end surface placed in the second direction 901 in the solid electrolytic capacitor 500, and the fillet formation part 400 shown in the first embodiment exists similarly in the end surface part.

Accordingly, in this embodiment, as there are three terminals and four fillet formation parts 400 (the recessed parts 112a to 112d), it is possible to achieve more stable mounting characteristics and reduce the ESL characteristics.

Note that as the details of the via 111 and the fillet formation part 400 are same as the abovementioned FIGS. 5A and 5B, the explanation is omitted.

Third Embodiment

Figure 3A:
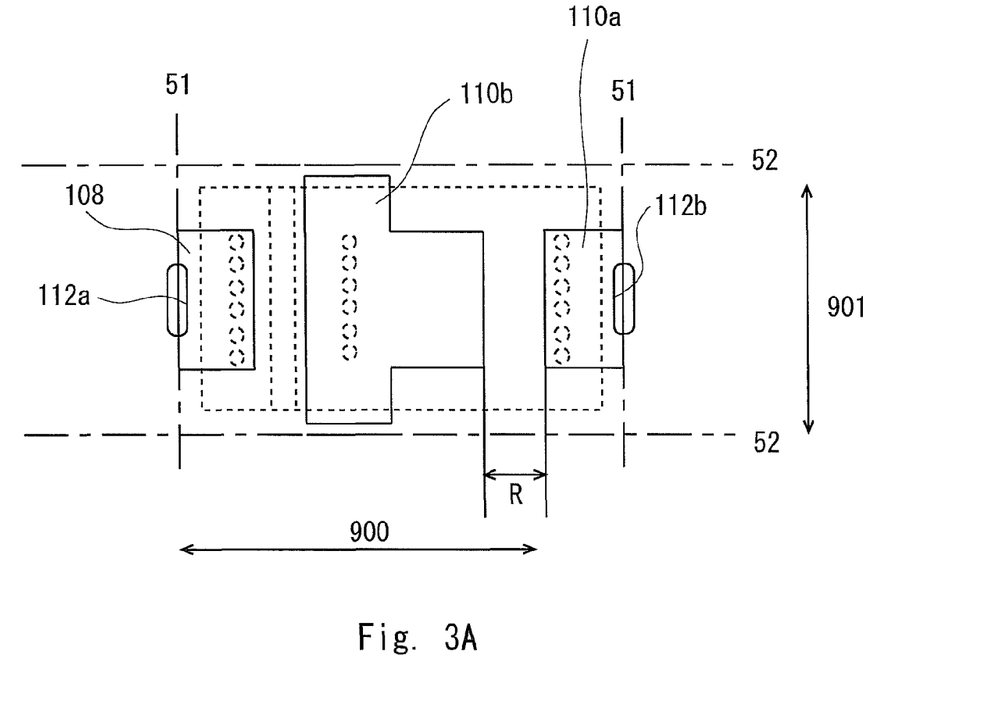
FIG. 3A is a product bottom view of the solid electrolytic capacitor viewed from the mounting electrode side according to a third embodiment of the present invention.
Figure 3B:
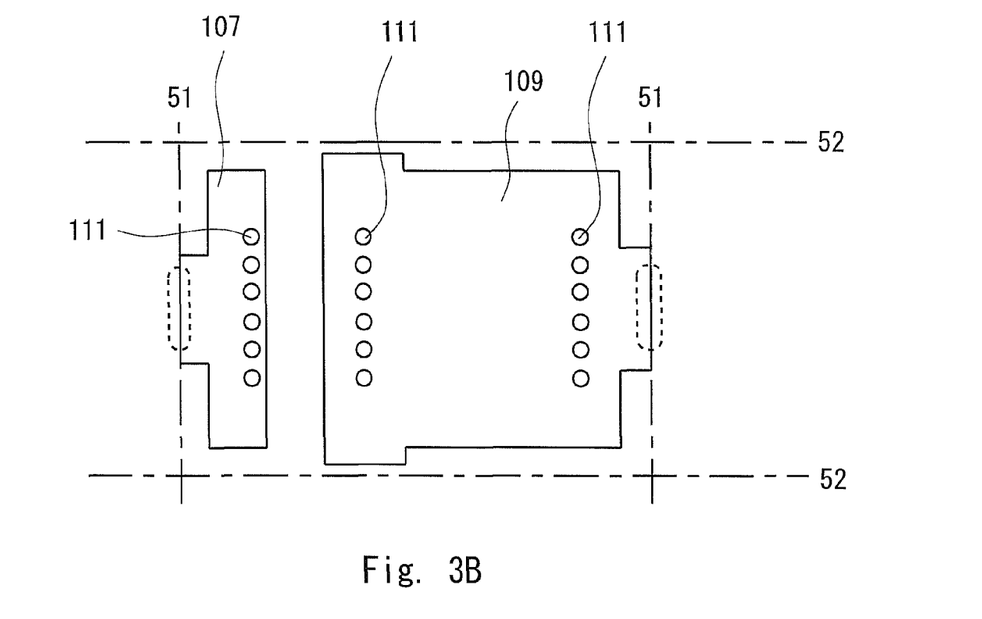
FIG. 3B is a top view of the electrode substrate viewed from the electrode for element connection side in the solid electrolytic capacitor according to the third embodiment of the present invention.

A third embodiment is explained using FIGS. 3A and 3B.

FIG. 3A is a product bottom view viewed from the mounting electrode side. FIG. 3B is a top view viewed from the electrode for element connection.

As compared with the second embodiment, in the third embodiment, there is no recessed parts 112c and 112d, and although the second cathode terminal 110b and the cathode terminal for element connection 109 extend in the second direction 901 but not up to the cutout line 52 and stops before the cutout line 52.

Other configuration is the same as the second embodiment. Note that there is no difference observed in the ESL value between the second and the third embodiments.

Fourth Exemplary Embodiment

Figure 4A:
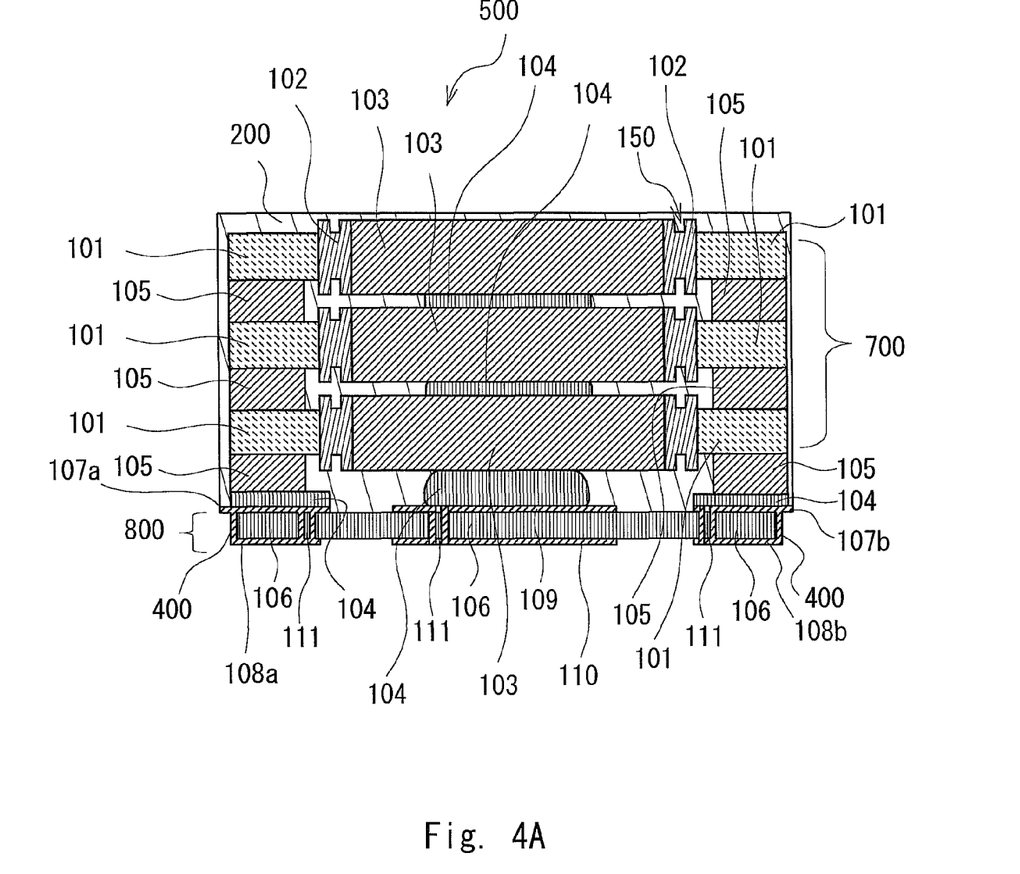
FIG. 4A is a product cross-sectional diagram of a solid electrolytic capacitor according to a fourth embodiment of the present invention.
Figure 4B:
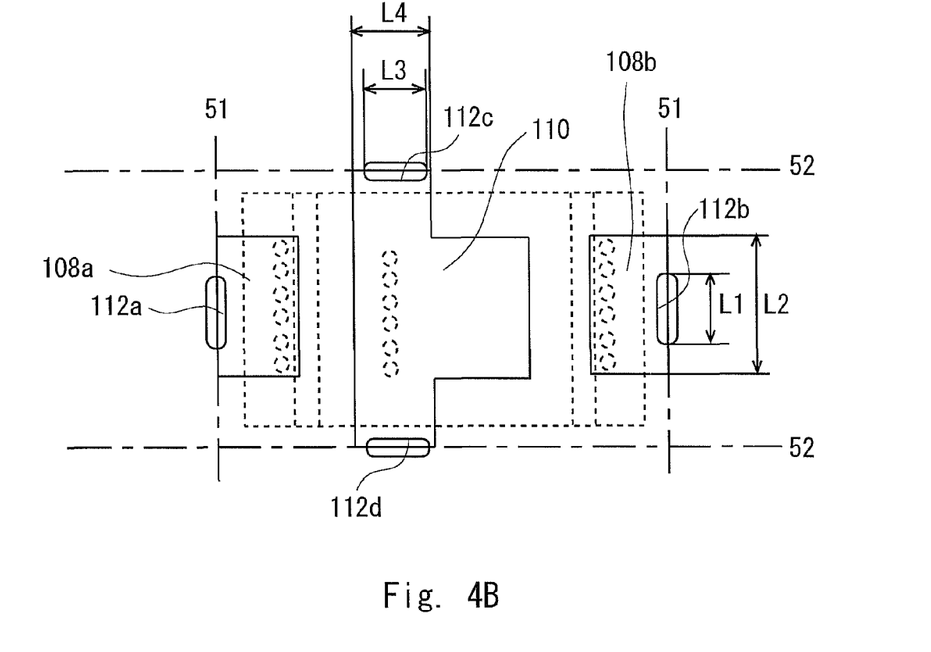
FIG. 4B is a product bottom view of the solid electrolytic capacitor viewed from the mounting electrode side according to the fourth embodiment of the present invention.
Figure 4C:
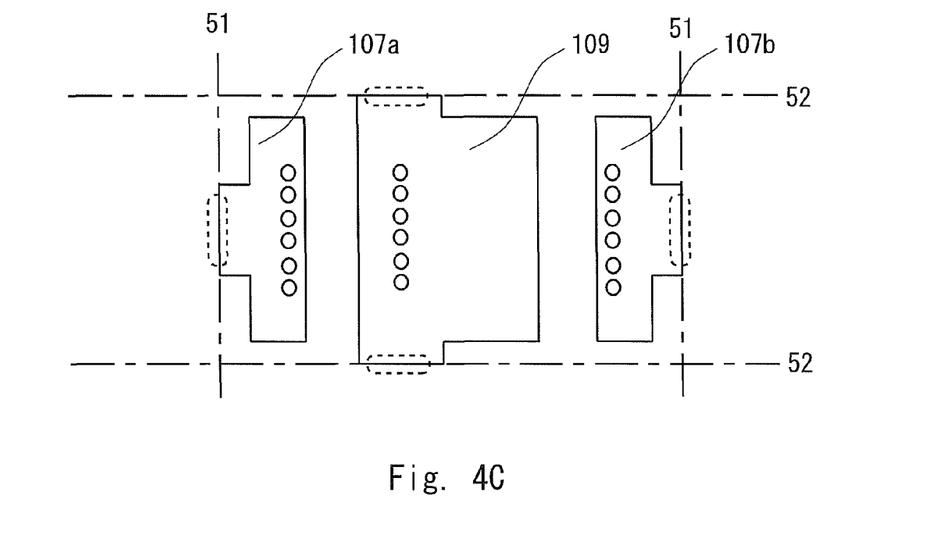
FIG. 4C is a top view of the electrode substrate viewed from the electrode for element connection side in the solid electrolytic capacitor according to the fourth embodiment of the present invention.

FIGS. 4A to 4C show a configuration of a solid electrolytic capacitor according to a fourth embodiment. FIG. 4A is a cross-sectional diagram of one solid electrolytic capacitor. FIG. 4B is a product bottom view viewed from the mounting electrode side. FIG. 4C is a top view viewed from the electrode for element connection side.

A structure of a capacitor stack element 700 of this embodiment is a stack of a transmission line element including the capacitor element anode parts 101 on both sides and the capacitor element anode parts 103 in the middle.

The electrode substrate 800 corresponds to the structure of the transmission line element, in which an anode terminal for element connection 107a and a mounting electrode side anode terminal 108a, and an anode terminal for element connection 107b and a mounting electrode side anode terminal 108b are placed on both sides, and the cathode terminal for element connection 109 and the mounting electrode side cathode terminal 110 are placed therebetween. The anode terminal for element connection 107a (107b) and the mounting electrode side anode terminal 108a (108b) are electrically connected through the via 111. The cathode terminal for element connection 109 and the mounting electrode side cathode terminal 110 are also electrically connected through the via 111.

Using the capacitor stack element 700 and the electrode substrate 800 including such transmission line structure, the bottom metal piece 105 of the anode part on the both sides of the capacitor stack element 700 and the anode terminal for element connection 107, and the bottom capacitor element cathode part 103 of the capacitor stack element 700 and the cathode terminal for element connection 109, are connected via the conductive adhesive 104.

After that, in a similar manner as the first embodiment, the solid electrolytic capacitor 500 is manufactured by covering with the outer coating resin 200 and then cutting along the cutout lines 51 and 52 by the dicing process or laser beam process. The cutout lines 51 and 52 are set to pass through the substantially middle position of long holes that are formed in the substrate 106 to form the recessed parts (112a to 112d). Incidentally, the recessed parts 112a and 112b have openings in the first direction 900 at the time of cut. The length L1 in the second direction 901 of the opening is preferably 10% or longer than the length L2 in the second direction 901 of the electrode terminal of the mounting electrode side near the recessed part 112a or 112b. Moreover, the recessed parts 112c and 112d have openings in the second direction 901. The length L3 in the first direction 900 of the opening is preferably 10% or longer than the length L4 in the first direction 900 of the electrode terminal of the mounting electrode side near the recessed part 112c or 112d.

Note that as the details of the via 111 and the fillet formation part 400 are same as the abovementioned FIGS. 5A and 5B, the explanation is omitted.

As for the three terminal structure shown in the second to fifth embodiments, a similar technique for leadframe of a related art is known. However for the leadframe, a cutting process of the leadframe by sputtering or the like is required and it is difficult to process. The terminal formation on the electrode substrate as in this embodiment requires only patterning, and it is another characteristic that it is easier than the complicated machining of the leadframe. Moreover, as the leadframe is not embedded in the outer coating resin, the volumetric efficiency can be improved.

Example 1

An example 1 is described using FIGS. 1A to 1D.

On aluminum foil (6.0 mm length, 3.5 mm width, and 350 μm thickness) with a surface enlarged by etching, a dielectric film was formed by an electrochemical process, and aluminized foil was formed. In order to attempt insulation between the anode part and the cathode part, the etching part of the aluminized foil was removed and then the insulating resin 102 was formed.

Further, as a solid electrolyte layer, a layer of conductive polymer polythiophene was formed by the chemical oxidative polymerization method using benzenesulfonic acid iron salt as an oxidant and 3, 4-ethylenedioxythiophene as a monomer on the surface of the aluminized foil. A graphite layer and a silver paste layer were further formed on the surface, and a capacitor element cathode part 103 was manufactured.

After that, the metal piece 105, which is a copper plate of 60 μm thickness plated with silver plating, was bonded to the capacitor element anode part 101 by ultrasonic welding. Furthermore, the capacitor element cathode part 103 was coated with the conductive adhesive 104, three capacitor element cathode parts 103 were stacked, and the capacitor element cathode parts 103 were electrically connected by drying for 60 minutes at 150 degrees Celsius.

Then, in order to bond the capacitor element anode parts 101, an aluminum substrate and the metal piece 105, which compose the capacitor element anode part 101, are bonded by laser welding, and a three stacked capacitor stack element 600 is manufactured. The rated voltage in this case was 2 V and rated capacity was 470 μF.

After that, on the substrate 106 made of glass epoxy with 100 μm thickness, copper foil of 20 μm was applied, copper plating of 20 μm thickness was further applied thereon, and the anode terminal for element connection 107 and the cathode terminal for element connection 109, the mounting electrode side anode terminal 108, and the mounting electrode side cathode terminal 110 were formed. At this time, copper plating was applied at the same time to the plurality of vias 111 that were formed by laser, and each of the electrode terminal for element connection and the mounting electrode side electrode terminal in the abovementioned anode part and the cathode part were conducted. Moreover, in a similar manner, copper plating was formed to the entire circumference including the side surface of the fillet formation part 400 (recessed part).

After that, gold plating of 0.06 μm is applied to the upper surface with copper plating formed thereon, and a circuit was formed. Then the electrode substrate 800 of 200 μm thickness was obtained.

Next, the conductive adhesive 104 including silver is coated to predetermined positions, and then by hardening and drying for 60 minutes at 150 degrees Celsius, the bottom metal piece 105 of the anode part of the manufactured capacitor stack element 600 and the anode terminal for element connection 107, and the bottom cathode part 103 of the cathode part of the capacitor stack element 600 and the cathode terminal for element connection 109, are bonded.

Then, by covering with the outer coating resin 200, which is epoxy resin, and cutting the previously copper-plated recessed part 112 along the cutout line 51, the fillet formation part 400 (anode part and cathode part) was formed. Further, by cutting along the cutout line 52, which is the product external dimension in the width direction of the solid electrolytic capacitor, the solid electrolytic capacitor 500 of 4.3 mm width, 7.3 mm length, and 1.9 mm height was obtained with stable fillets, improved volumetric efficiency, and better visibility after mounting. The rated voltage of the obtained solid electrolytic capacitor 500 was 2 V, and the rated capacity was 470 μF.

Example 2

An example 2 is described using FIGS. 2A to 2C. Differences from the example 1 are focused.

As the manufacture example of the capacitor stack element 600 and the mounting method of the capacitor stack element 600 to the electrode substrate 800 is same as the example 1, the explanation is omitted.

Although the top view of the electrode substrate used in the example 2 is shown in FIG. 2A, the second cathode terminal 110*b* of the mounting electrode side is placed to a position spaced 1.5 mm (R in FIG. 2B) apart from the first cathode terminal 110*a* of the mounting electrode side placed to the first direction end surface of the electrode substrate 800. The shape is a substantially T-shape, the terminal extending in the second direction of the second cathode terminal 110*b* of the mounting electrode side reaches the end surface of the second direction, and the fillet formation part 400 shown in the second embodiment was obtained in the end surface part. That is, in this example, there were three terminals and four fillet formation parts 400.

After mounting the capacitor stack element 600 to correspond to the abovementioned electrode substrate 800, it was covered with the outer coating resin 200, which was epoxy resin, the recessed part 112 (112*a* to 112*d*) that was previously copper-plated was cut along the cutout lines 51 and 52. Then the fillet formation part 400 (anode part and cathode part) was formed.

In this example, there were a total of four fillets on the mounting surface. Specifically, there were two fillets (112*a* and 112*b*) in the anode part and two fillets (112*c* and 112*d*) in the cathode part.

By cutting along the cutout lines 51 and 52, which was the product external dimension in the width and length direction of the solid electrolytic capacitor, the solid electrolytic capacitor 500 with a transmission line structure of 4.7 mm width, 7.3 mm length, and 1.9 mm height was obtained with stable fillets, improved volumetric efficiency, and better visibility after mounting.

Note that the details of the via 111 and the fillet formation part 400 are same as the abovementioned FIGS. 5A and 5B, and the manufactured solid electrolytic capacitor 500 had the rated voltage of 2 V and the rated capacity of 470 μF.

Example 3

An example 3 is described using FIGS. 4A to 4C. On aluminum foil (6.0 mm length, 3.5 mm width, and 350 micrometers thickness) with a surface enlarged by etching, a dielectric film was formed by an electrochemical process and aluminized foil was formed. In order to attempt insulation between the anode part and the cathode part, the etching part of both ends of the aluminized foil was removed and then the insulating resin 102 was formed.

After conductive polymer was formed by the chemical oxidative polymerization method using 3,4-ethylenedioxythiophene as a monomer and 21 weight % ammonium persulfate solution as an oxidant to be a solid electrolyte layer, a graphite layer and a silver paste layer were further formed, and the capacitor element cathode part 103 was manufactured. Next, a predetermined position of the insulating resin 102 on both ends was cut by laser radiation, so that the anode part and the cathode part were completely separated (150).

Next, after the capacitor element anode part 101 is ultrasonically welded to the metal piece 105, the cathode part has the conductive adhesive 104 made of silver interposed therebetween, the anode part is bonded by laser welding, and by laminating them, the capacitor stack element 700 with the transmission line structure is manufactured. The rated voltage in that case was 2 V and the rated capacity was 330 μF.

The substrate 106 with 100 μm thickness made of glass epoxy is copper-plated with a plating thickness of 20 μm, the anode terminal for element connection 107 was formed to both ends of the substrate, and the cathode terminal for element connection 109 was formed in the middle. At this time, copper plating was applied at the same time to the plurality of vias 111 that were formed by laser, and each of the electrode terminal for element connection and the mounting electrode side electrode terminal in the abovementioned anode part and the cathode part were conducted. Moreover, in a similar manner, copper plating was formed to the entire circumference including the side surface of the fillet formation part 400 (recessed part).

After that, gold plating of 0.06 μm is applied to the upper surface with copper plating formed thereon, the circuit was formed on the electrode substrate, and the electrode substrate 800 of 200 μm thickness was obtained.

Next, the conductive adhesive 104 including silver is coated to predetermined positions, and then by hardening and drying for 60 minutes at 150 degrees Celsius, the bottom metal piece 105 of the capacitor element anode part 101 that is placed to both ends of the capacitor stack element 700 and the anode terminal for element connection 107, and bottom the capacitor element cathode part 103 of the capacitor stack element 700 and the cathode terminal for element connection 109, are bonded.

After mounting the capacitor stack element 700 to correspond to the abovementioned electrode substrate 800, it was covered with the outer coating resin 200, which was epoxy resin, the recessed part 112 (112*a* to 112*d*) that was previously copper-plated was cut along the cutout lines 51 and 52. Then the fillet formation part 400 (anode part and cathode part) was formed.

In this example, there were a total of four fillets on the mounting surface. Specifically, there were two fillets (112*a* and 112*b*) in the anode part and two fillets (112*c* and 112*d*) in the cathode part.

By cutting along the cutout lines 51 and 52, which was the product external dimension in the width and length direction of the solid electrolytic capacitor, the solid electrolytic capacitor 500 with a transmission line structure of 4.7 mm width, 7.3 mm length, and 1.9 mm height was obtained with stable fillets, improved volumetric efficiency, and better visibility after mounting.

Note that the plating structure and thickness of the electrode terminal and the via are same as the abovementioned example 1.

Comparative Example 1

The capacitor with the structure shown in FIG. 6 of Japanese Unexamined Patent Application Publication No. 2006-190925 was obtained as a capacitor with two terminals using the leadframe.

Comparative Example 2

Similarly, the capacitor with the structure shown in FIG. 1 of Japanese Unexamined Patent Application Publication No. 2006-190925 was obtained as a capacitor with three capacitors using the leadframe.

Note that in the comparative examples 1 and 2, the rated voltage was 2 V, the rated capacity was 470 µF, and the external dimension was that the width was 4.3 mm, the length was 7.3 mm, and the height was 1.9 mm in a similar manner as the example.

The comparison of the ESL values in the examples 1 to 3 and the comparative examples 1 and 2 is shown in the table 1.

TABLE 1

|  | ESL(pH) |
|---|---|
| Example 1 | 600 |
| Example 2 | 300 |
| Example 3 | 200 |
| Comparative Example 1 | 1200 |
| Comparative example 2 | 400 |

The table 1 shows that ESL in the present invention is low.

As for the comparison of the number of terminals, the exemplary advantage is more notable in the comparison between the example 1 and the comparative example 1, in which there are two terminals, and the comparison between the examples 2 and 3 and the comparative example 2, in which there are three terminals.

From this result, the present invention has effectively reduced the current path as compared to the comparative examples, and thus solves the problem of the related arts.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A solid electrolytic capacitor comprising:
   a capacitor element including an anode part that is placed to at least one end part of an anode body including linear, foil-like, or plate-like valve metal and a cathode part that is placed in a region separated from the anode part by insulating resin;
   an electrode substrate including an electrode terminal for element connection that is formed to one surface and electrically connected to the anode part or the cathode part of the capacitor element, an electrode terminal of a mounting electrode side that is formed to another surface and electrically connected to an electrode terminal of a circuit substrate, and a connection part that electrically connects the electrode terminal for element connection and the electrode terminal of the mounting electrode side; and
   a covering member that covers the capacitor element, wherein
   a first recessed part is formed to a side surface that is placed in a first direction of the electrode substrate, and the first recessed part is covered with a conductive member so that the first recessed part is electrically connected to the electrode terminal of the mounting electrode side or the electrode terminal for element connection, and
   the electrode terminal for element connection extends to an end surface of the covering member at least along with the first direction and covers an upper part of the first recessed part, and
   a gas escape gap is formed between the electrode terminal for element connection and the covering member above the first recessed part, and gas escapes through the gas escape gap at the end surface of the covering member above the first recessed part from a conductive adhesive that connects the anode part or the cathode part of the capacitor element with the electrode terminal for element connection.

2. The solid electrolytic capacitor according to claim 1, wherein the electrode terminal of the mounting electrode side comprises:
   a first electrode terminal that extends to one end surface placed in the first direction of the covering member;
   a second electrode terminal that extends to another end surface placed in the first direction of the covering member; and
   a third electrode terminal that is electrically connected to an electrode terminal and placed in a region spaced from the second electrode terminal, the electrode terminal having a polarity different from the electrode terminal for element connection that is electrically connected to the first electrode terminal or the second electrode terminal, wherein
   a second recessed part is formed to a side surface placed in a second direction that is perpendicular to the first direction of the electrode substrate and the second recessed part is covered with the conductive member so that the second recessed part is electrically connected to the third electrode terminal or the electrode terminal for element connection connected to the third electrode terminal, and
   the third electrode terminal extends to the end surface of the covering member along the second direction and covers an upper part of the second recessed part.

3. The solid electrolytic capacitor according to claim 1, wherein the capacitor element includes the anode part that is placed to both ends of the anode body including the linear, foil-like, or plate-like valve metal and the cathode part placed between the anode part.

4. The solid electrolytic capacitor according to claim 1, wherein the solid electrolytic capacitor is adhered to the circuit substrate via solder.

5. The solid electrolytic capacitor according to claim 2, wherein the first recessed part or the second recessed part and at least a part of the electrode terminal for element connection is covered with a fillet formed by the solder.

6. The solid electrolytic capacitor according to claim 1, wherein the first recessed part includes an opening in the first direction, and a length in the second direction that is perpendicular to the first direction in the opening is 10% or longer than a length in the second direction of the electrode terminal of the mounting electrode side near the first recessed part.

7. The solid electrolytic capacitor according to claim 2, wherein the second recessed part includes an opening in the second direction, and a length in the first direction that is perpendicular to the second direction in the opening is 10% or longer than a length in the first direction of the electrode terminal of the mounting electrode side near the second recessed part.

8. The solid electrolytic capacitor according to claim 1, wherein
a substrate does not exist in the upper part of the first recessed part, and
the electrode terminal for element connection is exposed from an end surface of the solid electrolytic capacitor.

9. The solid electrolytic capacitor according to claim 1, wherein a part parallel to the end surface of the solid electrolytic capacitor in the first recessed part is formed of a straight surface.

10. The solid electrolytic capacitor according to claim 2, wherein
a substrate does not exist in the upper part of the first recessed part or the second recessed part, and
the electrode terminal for element connection is exposed from an end surface of the solid electrolytic capacitor.

11. The solid electrolytic capacitor according to claim 2, wherein a part parallel to the end surface of the solid electrolytic capacitor in the first recessed part or the second recessed part is formed of a straight surface.

* * * * *